United States Patent [19]
Grasso et al.

[11] Patent Number: 6,011,686
[45] Date of Patent: Jan. 4, 2000

[54] AUDIO DEVICES FOR A PORTABLE COMPUTER

[75] Inventors: Anthony M. Grasso, Dakota Dunes, S. Dak.; Michael J. Ritter, Sioux City, Iowa

[73] Assignee: Gateway 2000, Inc., North Sioux City, S. Dak.

[21] Appl. No.: 08/963,878

[22] Filed: Nov. 4, 1997

[51] Int. Cl.7 .................................................. G06F 1/16
[52] U.S. Cl. ...................................... 361/686; 174/DIG. 9
[58] Field of Search .................................... 361/683, 686; 364/708.1; 174/69, 135, DIG. 9

[56] References Cited

U.S. PATENT DOCUMENTS

| | | | |
|---|---|---|---|
| 3,426,282 | 2/1969 | Brady | 325/353 |
| 3,671,685 | 6/1972 | McCabe | 179/156 |
| 3,798,389 | 3/1974 | Tokizaki | 179/101 |
| 4,297,535 | 10/1981 | Hehemann | 179/156 R |
| 4,597,469 | 7/1986 | Nagashima | 181/129 |
| 4,691,383 | 9/1987 | DeMars | 455/351 |
| 4,764,961 | 8/1988 | Hung | 381/24 |
| 4,942,617 | 7/1990 | Boylan | 381/182 |
| 5,199,888 | 4/1993 | Condra et al. | 364/708.1 |
| 5,329,592 | 7/1994 | Altman | 381/25 |
| 5,422,957 | 6/1995 | Cummins | 381/187 |
| 5,444,768 | 8/1995 | Lemaire et al. | 379/68 |
| 5,481,616 | 1/1996 | Freadman | 381/90 |
| 5,490,039 | 2/1996 | Helms | 361/683 |
| 5,506,911 | 4/1996 | Neuman et al. | 381/183 |
| 5,687,387 | 11/1997 | Endejan et al. | 439/638 |
| 5,717,430 | 2/1998 | Copland et al. | 364/708.1 |

*Primary Examiner*—Donald Sparks
*Assistant Examiner*—John D. Reed
*Attorney, Agent, or Firm*—Schwegman, Lundberg, Woessner & Kluth P.A.; Anthony Claiborne

[57] ABSTRACT

A portable computer is provided with retractable ear phones. The ear phones can include ear buds with an outer cushion. The ear buds are retractably coupled with the portable computer by an audio cable. A retraction mechanism retracts the audio cable and ear buds into the computer. The portable computer has a cut out sized to receive the ear buds therein, which creates a place to store the ear buds during periods of non-use. To use the ear buds, a user removes the buds from the storage position, and pulls the audio cable from the computer. Pulling the audio cable activates the ear buds and disables an audio output device on the portable computer. To return the ear buds to a storage position, a retraction actuator is depressed which retracts the audio cable into the portable computer. Alternatively, the ear buds can be replaced or used in addition to an audio input device. The ear buds and/or audio input device can be provided on other devices, such as a portable keyboard.

20 Claims, 4 Drawing Sheets

AUDIO DEVICES FOR A PORTABLE COMPUTER

FIELD OF THE INVENTION

The present invention relates generally to portable computers and portable computer components. More particularly, it pertains to audio devices for portable computers.

BACKGROUND OF THE INVENTION

Currently, computer applications frequently involve audio sounds for alerting or entertaining a computer user. Other sound producing applications include computer software for physically challenged individuals. Computer users are now also using personal computers (PCS) for communicating with others in place of telephones, and using computers for video conferences. The added sensual dimension of sound enhances the PC experience. A multimedia PC extends the computer's capabilities of interacting with the world to include sound. Thus, it is important to have devices which can effectively provide speaker support for these applications. Audio compact discs (CDS) are also frequently played on PCS by users while they work or play on the PC. Portable computers typically have integral speakers disposed proximate to the display or the keyboard. Two speakers are sometimes provided for stereophonic sound.

The use of portable computers has increased as the computers have become more powerful. These computers are now being utilized in places such as automobiles, on public forms of transportation, or in bed. However, a portable computer transmitting audio sounds from the speakers could be prohibited in some instances or could be annoying to others nearby. In addition, the computer user has limited privacy with respect to the sounds broadcast over the speakers, which could be problematic for the user.

Some people in offices each have their own portable computer. These people use their computers to do work which may involve use of external speakers. However, offices commonly provide work space in the form of cubicle structures to maximize available office space. These structures are provided in close proximity to one another, with open air space near the ceiling area. Many personnel can be seated in a smaller amount of floor space, yet each person may have their own desk and computer space. Given the close proximity of the work spaces, sound easily travels from one cubicle to another. Sound generated by one person's computer may distract or annoy another person working at a nearby cubicle, particularly if frequent sounds are generated by the computer, or if a particular computer user requires sound intense software programs.

One solution to this problem is to provide earphones for the individual computer operator. Earphones operate similar to speakers. However, the output device is much smaller. The earphone is shaped to cover an ear, and provides sufficient output sound for only the user to hear when the device is placed proximate to the ear. As a result, a user seated in an adjacent cubicle is no longer disturbed by the noise generated to the output device.

To use the earphones, the operator connects the earphones by inserting the earphone plug into an audio output device which in many cases turns off or disables audio output from being sent to the speakers. For personal computers, the plug is located in a rear portion of the computer. When reaching toward this rear portion, the operator must fumble with the other cables and wires connecting other peripheral devices, such as a separate power supply cord providing electricity to the computer. Since the operator must plug the earphone into the rear portion of the computer, the operator may not directly look at where the device is being inserted. As result, the operator may attempt to insert the plug into a hole not intended for this plug and cause damage to the computer.

Furthermore, finding the appropriate plug is time consuming and tedious. If an operator frequently changes between speakers and earphones, finding the plug in the rear portion can consume valuable working time. When the operator is finished using the earphones, the operator must again fumble with cables and wires located behind the device to unplug the earphones. The earphones must be stored separate from the portable computer, such as in a desk. The earphones could become misplaced away from the computer. To store the earphones, the cord is often wrapped around the earphones a number of times. This procedure could result in damage to the cord. Alternatively, an operator could wear the earphones all day long. However, this would be impractical and likely uncomfortable to the operator.

Accordingly, what is needed is a better way to provide a portable computer with a private sound system. Such a private audio system needs to be readily accessible, easy to locate, and easy to enable. What is further needed is a way to prevent damage to or displacement of the private audio system.

SUMMARY OF THE INVENTION

A portable computer is adapted for coupling with an earphone assembly. The portable computer has a computer body which encompasses a processor and memory of the computer. A private audio system, such as an earphone assembly, is retractably coupled within the computer body. In one embodiment, a cut out is located within a speaker on the computer, and the earphone assembly is retractably disposed within the cut out in the speaker.

The earphone assembly includes an audio cable which transmits audio signals from the portable computer. In one embodiment, the earphone assembly also includes ear buds, where a first ear bud transmits a left channel signal, and a second ear bud transmits a right channel audio signal. In another embodiment, audio controls are provided on the portable computer for manipulating the audio signals of the earphone assembly. In yet another embodiment, a switching mechanism is provided which actuates the earphone assembly when the earphone assembly is removed from the computer. The switching mechanism can be a microswitch, an optical sensor, or other mechanisms which switch the earphone assembly as it is removed from the portable computer.

Alternatively, in another embodiment, a portable computer has a computer body encompassing the computer, including a processor and memory. A microphone assembly is retractably coupled with the computer body by an audio cable. A cut out disposed within one surface of the computer body receives the microphone assembly therein. A retraction mechanism is coupled with microphone assembly which retracts the microphone assembly into the cut out.

The portable computer allows a computer user to easily store earphone and/or a microphone assembly within the computer. The retractable features of the assemblies reduce the risk of damaging or tangling the audio cable. In addition, the assemblies will not become misplaced away from the computer. A further benefit is the minimal space required for the earphones.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. Therefore, the following detailed description is not to be taken in a limiting sense, and the scope of the present invention is defined by the appended claims.

Figure 1:
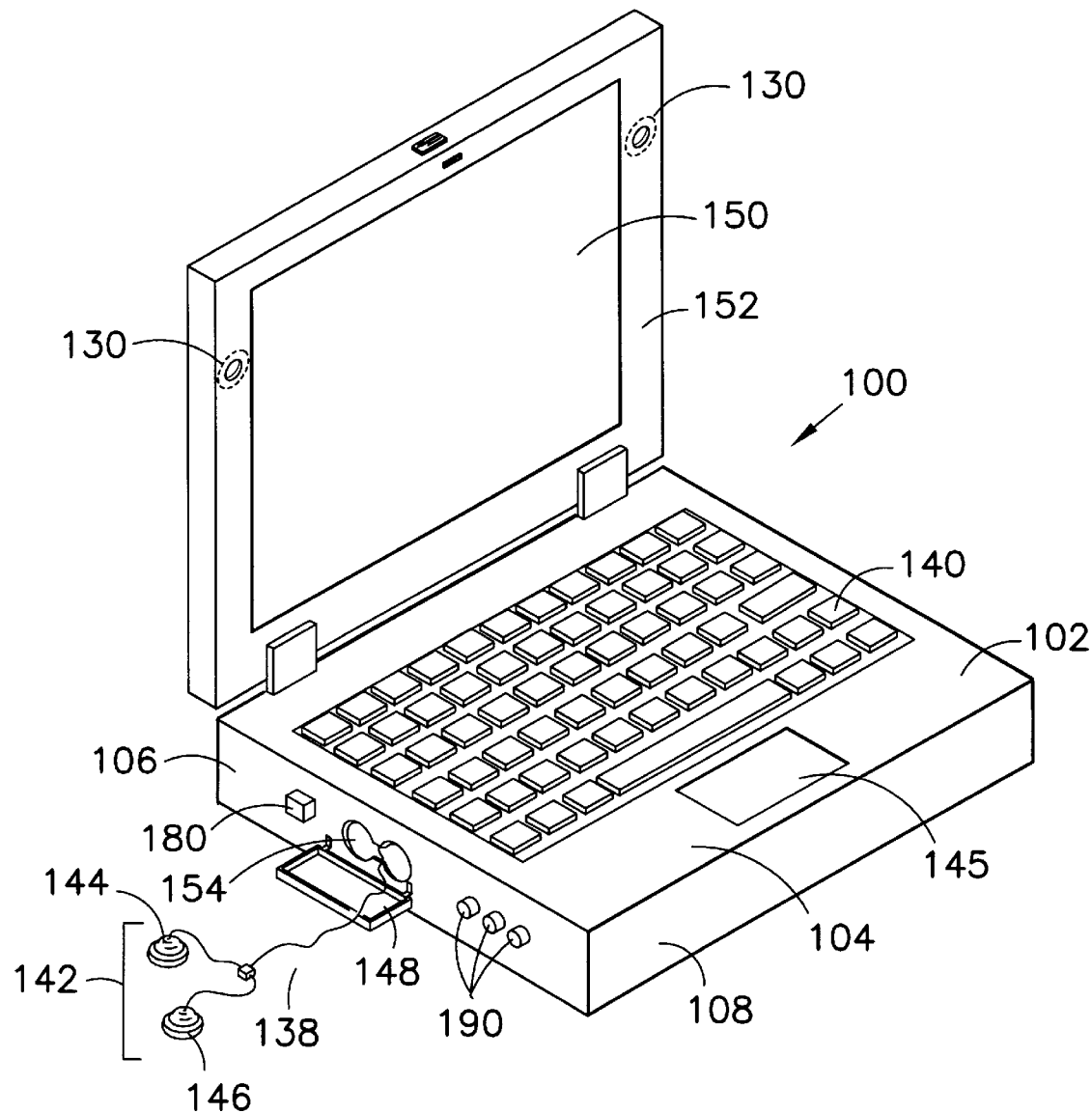
FIG. 1 is a perspective view illustrating a portable computer constructed in accordance with one embodiment of the present invention.

A portable computer 100 is shown in FIG. 1. The portable computer 100 has a graphic display 150, surrounded by a bezel 152, a graphical pointing device 145, and a data entry device 140. Encompassing the portable computer 100 is a computer body 102. Disposed within the computer body 102 are a processor and a memory (not shown). The computer body 102 is comprised of a plurality of surfaces, including a top input surface 104, side surfaces 106, and front surface 108. The terms "top", "side" and "front" refer to one orientation where the portable computer 100 rests on a base surface, such as a desk, but are not intended in a restrictive sense.

Disposed within the bezel 152 are audio output devices 130. Alternatively, the audio output devices 130 can be disposed in other surfaces of the computer body 102, such as one of the side surface 106. The audio output devices 130 facilitate providing sound for a computer user. The portable computer 100 also includes a second set of audio output devices 142. The second set of audio output devices 142 comprise an earphone assembly, and are for providing a private sound for a computer user, since the second set of audio output devices 142 are typically in close proximity to a user's ear during use. In one embodiment, the second set of audio output devices 142 are left and right channel ear buds 144, 146. The ear buds 144, 146 fit within an outer ear channel during use of the second set of audio output devices 142. In another embodiment, the ear buds 144, 146 have a cushion for an outer surface, providing added comfort and frictional stability to the user when the buds 144, 146 are placed within the outer ear.

The ear buds 144, 146 are coupled with the portable computer 100 by an audio cable 138. The audio cable 138 transmits the audio signal from the portable computer 100 to the ear buds 144, 146. Although ear buds 144, 146 have been described, other devices for transmitting sound such as a head set, a head phone, or an ear phone can be incorporated in place of the ear buds 144, 146 and are considered within the scope of the invention. In addition, the second set of audio output devices 142 can include an attachment device for attaching or hanging the second set of audio output devices 142 in a location proximate to a user's ear.

The ear buds 144, 146 are removably coupled with a side surface 106 of the portable computer 100. Alternatively, in another embodiment, the ear buds 144, 146 are coupled on the input surface 104 or the front surface 108 of the portable computer 100. As obvious to those skilled in the art, the ear buds 144, 146 could be coupled on alternative surfaces of the portable computer 100.

The side surface 106 has a cut out 154 for receiving the second set of audio output devices 142 therein. In one embodiment, the cut out 154 is disposed within the audio output device 130. The cut out 154 is sized to receive both ear buds 144, 146 therein. The depth of the cut out 154, in another embodiment, is sized to receive the ear buds 144, 146 therein wherein an outer surface of the ear buds 144, 146 is substantially flush with the side surface 106. The second set of audio output devices 142 are stored within the cut out 154 during use of the audio output device 130.

In one embodiment, a protective cover 148 is coupled to the side surface 106 of the portable computer 100. The protective cover 148 is shown in an open position, while the second set of audio output devices 142 are in use. The protective cover 148 is sized and shaped to cover the second set of audio output devices 142 in a closed position. The protective cover 148 is frictionally engaged with a portion of the side surface 106 to retain the protective cover 148 in the closed position. Alternatively, in another embodiment, the protective cover 148 can be provided with a seal for providing additional protection to the second set of audio output devices 142 when they are exposed to harsh environments.

The portable computer 100 also includes a retraction actuator 180. The retraction actuator 180 is, in one embodiment, a button disposed proximate to the second set of audio output devices 142. When the retraction actuator 180 is activated, the audio cable 138 coupled with the second set of audio output devices 142 is retracted into the computer body 102, as will be discussed further below. Although the retraction actuator 180 is illustrated as a button, other devices can be incorporated with the portable computer 100 to operate as the retraction actuator 180. For instance, the retraction actuator 180 could be incorporated with the protective cover 148. Alternatively, the retraction actuator 180 could include a switch disposed within the computer body 102 and actuated through a software program.

In another embodiment, audio controls 190 are provided on the portable computer 100. The audio controls 190 could take on a number of configurations. The controls 190 could be in the form of knobs rotatably coupled with the computer body 102. Alternatively, the audio controls 190 could be provided in the form of slider switch levers disposed on the computer body 102. The audio controls 190 allow a user to manipulate various conditions with respect to the audio output devices 130 or the second set of audio output devices 142. For instance, the audio controls 190 could include a volume control for the second set of audio output devices 142. In addition, the audio controls 190 could also include a control to modify the ratio of the total audio signal delivered to each of the ear buds 144, 146.

Figure 2:
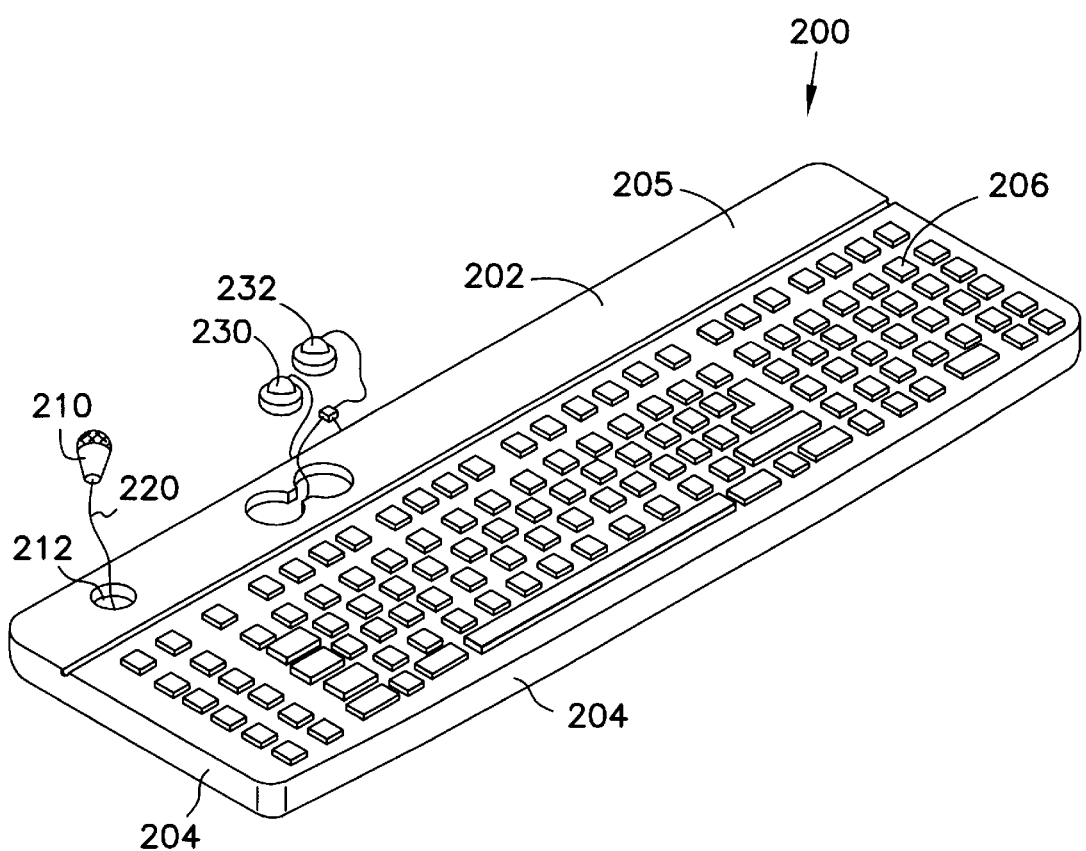
FIG. 2 is a perspective view illustrating a portable keyboard constructed in accordance with one embodiment of the present invention.

FIG. 2 illustrates another embodiment of the present invention. A portable keyboard 200 is encompassed by a keyboard body 202, defined in part by side surfaces 204 and input surface 205. The portable keyboard 200 includes a data input device 206 disposed on the input surface 205 for entering data. Although a portable keyboard 200 is shown, a portable computer could also be used. An audio input device 210 is coupled with one of the side surfaces 204. Alternatively, the audio input device 210 could be coupled with the input surface 205. The keyboard body 202 includes a cut out 212 on one of the side surfaces 204 for receiving the audio input device 210 therein. Alternatively, the cut out 212 could be disposed within the input surface 205.

The audio input device 210 permits a user to enter sounds which are then transmitted as audio signals. The audio input device 210 has many uses, including video conferences, telephone, or creating sound bytes. The audio input device 210, in one embodiment, is a microphone. However, other audio input devices could also be incorporated. The audio input device 210 can be included in addition to ear buds 230, 232 for facilitating uses such as a telephone.

The audio input device 210 is coupled with the portable keyboard 200 or a portable computer (FIG. 1) with an audio cable 220. In a storage position, the audio cable 220 is retracted into the keyboard body 202 and the audio input device 210 is disposed within the cut out 212. In one embodiment, an outer surface 216 of the audio input device 210 is substantially flush with the side surfaces 104 when placed in a storage position. A retraction mechanism (FIGS. 4a and 4b), as will be discussed further below, can be coupled with the audio input device 210 for retracting the device into the keyboard body 202.

The audio input device 210 can also be provided with an attachment device, which would allow users to couple the audio input device 210 with their clothing, or from a proximate location on their body or other nearby object providing an appropriate location. The attachment device could include a clip or a hook for hanging the audio input device 210.

Figure 3:
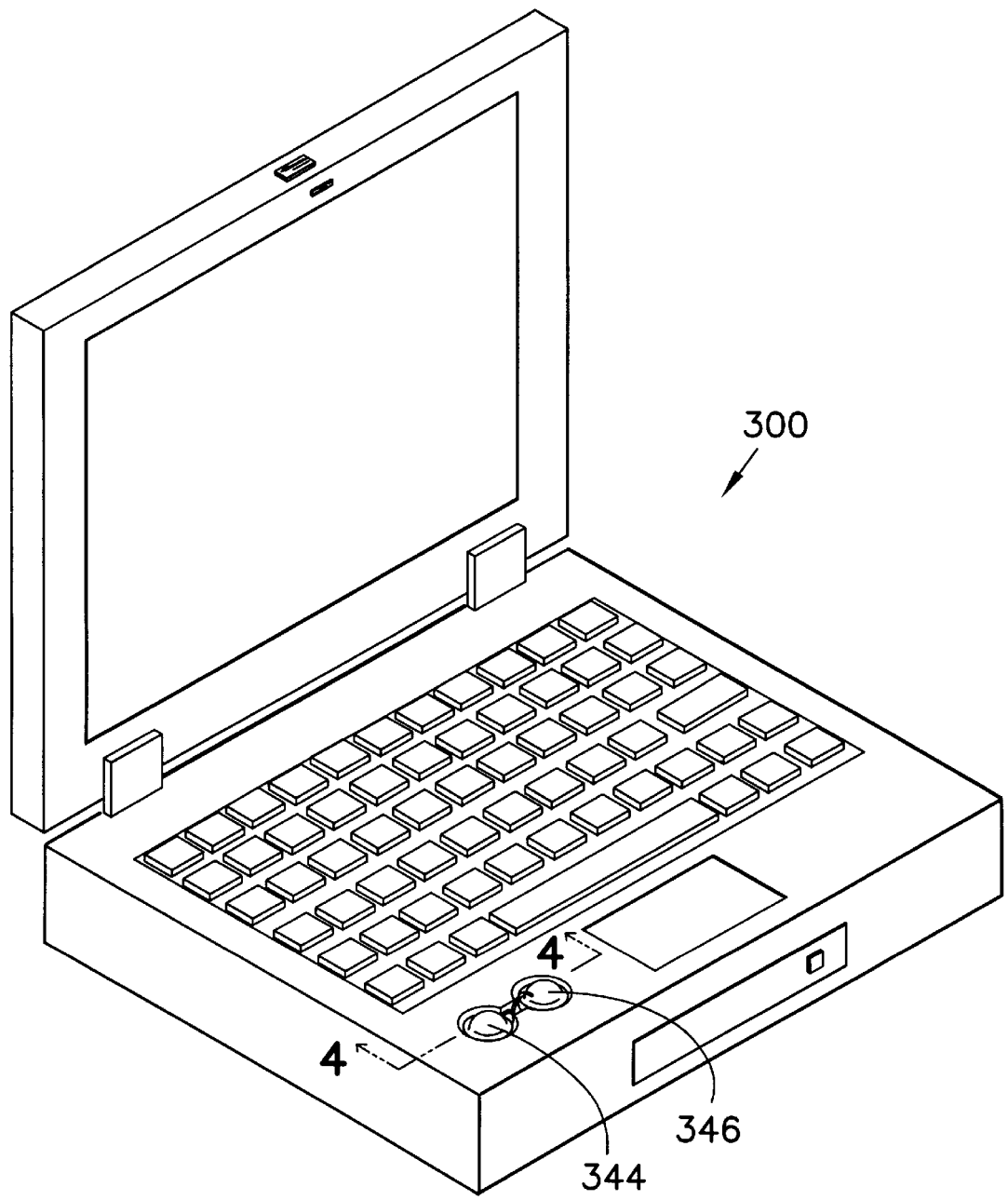
FIG. 3 is a perspective view illustrating a portable computer constructed in accordance with one embodiment of the present invention.
Figure 4A:
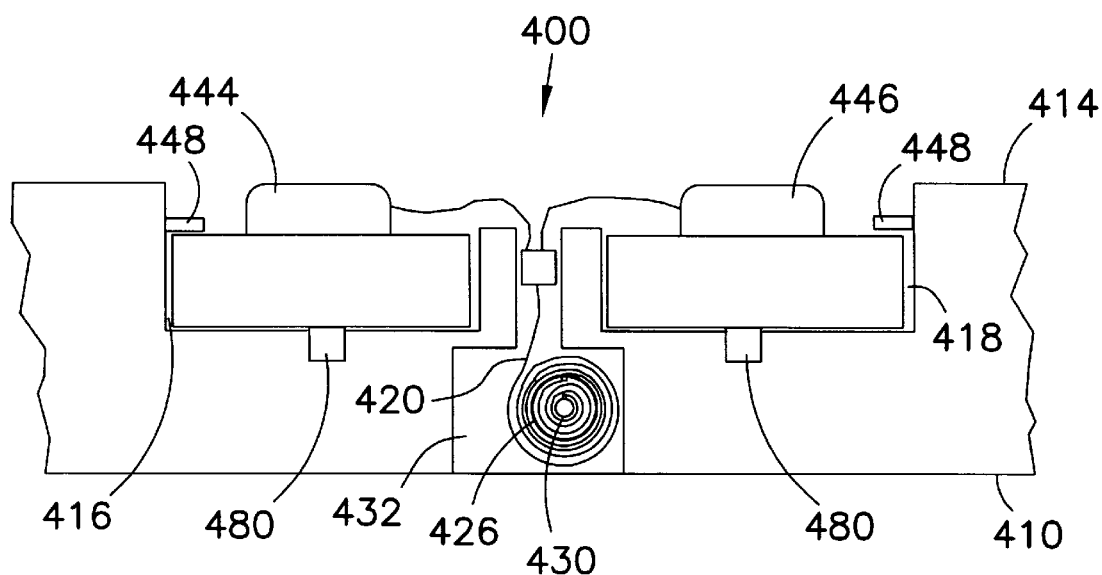
FIG. 4a is a cut-away view taken along 4—4 of FIG. 3 illustrating a portable computer constructed in accordance with one embodiment of the present invention.
Figure 4B:
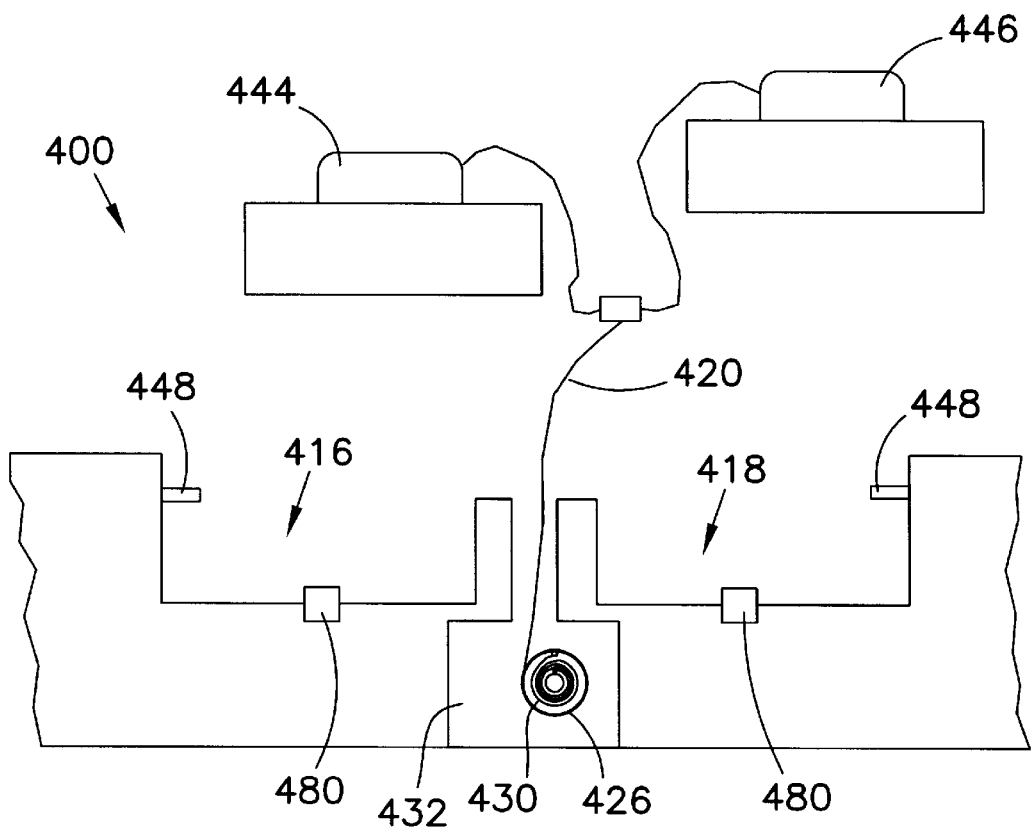
FIG. 4b is a cut-away view taken along 4—4 of FIG. 3 illustrating a portable computer constructed in accordance with one embodiment of the present invention.

FIG. 3 illustrates another embodiment, where ear buds 344, 346 are in a closed, storage position on a portable computer 300. In one embodiment, to place the ear buds 344, 346 in the storage position from an open position (FIG. 1), a retraction mechanism 430 is used. FIGS. 4a and 4b illustrate 8 he retraction mechanism 430 in greater detail, where FIG. 4a shows the ear buds 444, 446 in the storage position, and FIG. 4b shows the ear buds in an open position. An audio cable 420 couples the ear buds 444, 446 with portable computer 400. In one embodiment, the ear buds 444, 446 are removably coupled with the portable computer 400. The ear buds 444, 446 each have a mounting portion 448 and an audio output device portion 449. The audio output device portion 449 of the ear buds 444, 446 is inserted into a user's ear. The mounting portion 448 is used for placing the ear buds 444, 446 in a storage position during periods of non-use, as will be discussed further below.

The portable computer 400 has a computer body 410, which has an outer surface 414. The computer body 410 has a first and second cut out 416, 418 for receiving the ear buds 444, 446. The first and second cut outs 416, 418 are sized to receive the ear buds 444, 446 freely therein. Alternatively, in another embodiment, the cut outs are sized to frictionally engage with the audio output device portion 449 and/or the mounting portion 446. For instance, the ear buds 444, 446 can be retained by projections 448, as shown in FIG. 4a. When the ear buds 444, 446 are disposed in the cut outs 416, 418, the ear buds 444, 446 are, in one embodiment, substantially flush with the outer surfaces 414 of the computer body 410.

In the storage position, as shown in FIG. 4a, the audio cable 420 is wrapped around a spool 426. When the ear buds 444, 446 are placed in an open position, the audio cable 420 is unwrapped from the spool 426. The retraction mechanism 430 rotates the spool 426 to retract the audio cable 420 and wrap the audio cable 420 around the spool 426. In one embodiment, the retraction mechanism 430 includes a spring coil mechanism, such as an axial coil spring, coupled with the spool 426. The spring coil mechanism provides a spring bias to the spool 426, such that when activated, the spool 426 rotates and the audio cable 426 is wrapped around the spool 426. The retraction mechanism 430 is stored within a chamber 432 of the computer body.

To actuate the ear buds 444, 446, a switching mechanism 480 is used. The switching mechanism 480 is disposed within the cut outs 416, 418 of the computer body 410. The switching mechanism 480 detects the presence of the ear buds 444, 446 within the cut outs 416, 418 and activates the ear buds 444, 446 when they are removed from the portable computer 400. The switching mechanism 480 could take on a number of configurations. For instance, in one embodiment, the switching mechanism 480 comprises a common microswitch. Alternatively, in another embodiment, the switching mechanism 480 comprises an optical sensor. The optical sensor is disposed proximate to the audio cable. The audio cable 420 has a first portion at one end of the cable 420 having a first color, and a second portion including the remaining portion of the cable 420 having a second color. As a user removes the ear buds 444, 446 from the portable computer 400, the color of the audio cable 420 detected by the optical sensor changes. When the optical sensor detects a change in color on the cable 420, a signal is sent to either activate or deactivate the ear buds 444, 446 depending on whether the cable 420 is being removed from the computer 400 or retracted into the computer 400.

Advantageously, the portable computer 100 provides a place to store the second set of audio output devices when they are not in use. A further benefit is that the cut outs for the ear buds can be located on a side surface of the portable computer so that ear buds can be used even while the portable computer is closed. The earphones do not further clutter a desk or a drawer space, nor become displaced. The audio output devices are automatically enabled or disabled when the ear buds are replaced and removed, respectively, from the resting position within the portable computer. A user can easily switch on the ear buds as they are removed from the storage position.

It is to be understood that the above description is intended to be illustrative, and not restrictive. Many other embodiments will be apparent to those of skill in the art upon reviewing the above description. For instance, the earphone or the microphone assembly can be provided on other components such as a portable keyboard. The scope of the invention should, therefore, be determined with reference to the appended claims, along with the full scope of equivalents to which such claims are entitled.

What is claimed is:

1. A portable computer adapted for connecting with an earphone assembly, the computer comprising:

a computer body encompassing the computer;

the computer body having a cut out therein;

a processor and memory disposed within said body;

said earphone assembly disposed within said cut out; and a switching mechanism coupled with the earphone assembly, the switching mechanism for activating the earphone assembly when the earphone assembly is removed from the cut out.

2. The portable computer as recited in claim 1, wherein the computer body has at least one audio output device disposed therein the at least one audio output device having a recess disposed therein, and a second cut out is disposed within said recess of said audio output device the second cut out adapted to receive an earphone assembly therein.

3. The portable computer as recited in claim 1, wherein the earphone assembly comprises at least one ear bud and an audio cable.

4. The portable computer as recited in claim 3, the portable computer further comprising a spool coupled with the audio cable, wherein the audio cable is wrapped around the spool as the audio cable is retracted into the portable computer.

5. The portable computer as recited claim 1, wherein the earphone assembly comprises first and second ear buds, wherein the first ear bud transmits a left channel signal, and the second ear bud transmits a right channel signal.

6. The portable computer as recited in claim 4, wherein said cut out is sized to receive the ear bud therein.

7. The portable computer as recited in claim 4, wherein the audio cable is retractably coupled with the computer body.

8. A portable computer comprising:
a computer body encompassing the computer;
a processor and memory disposed within the body;
an earphone assembly having an audio cable coupled therewith;
the computer body having a cut out for receiving the ear phone assembly therein;
a retraction mechanism coupled with the earphone assembly, the retraction mechanism for retracting the earphone assembly into said cut out; and
a switching mechanism coupled with the earphone assembly, the switching mechanism for activating the earphone assembly when the earphone assembly is removed from the cut out.

9. The portable computer as recited in claim 8, wherein the retraction mechanism comprises a spring coil mechanism coupled with the earphone assembly.

10. The portable computer as recited in claim 8, wherein the portable computer further comprises a retraction actuator disposed on the computer body proximate to the earphone assembly.

11. The portable computer as recited in claim 8, the portable computer further comprising a cover assembly disposed over the cut out, wherein said cover assembly protects the earphone assembly disposed within the cut out.

12. The portable computer as recited in claim 8, the portable computer further comprising audio controls disposed within said computer body.

13. A portable computer comprising:
a computer body encompassing the computer;
a processor and memory disposed within the body;
an earphone assembly having an audio cable coupled therewith;
a switching mechanism coupled with the earphone assembly, the switching mechanism for activating the earphone assembly when the earphone assembly is removed from the computer body; and
a retraction mechanism coupled with the earphone assembly, the retraction mechanism for retracting the earphone assembly into the body.

14. The portable computer as recited in claim 13, wherein the switching mechanism comprises an optical sensor coupled with the audio cable.

15. The portable computer as recited in claim 13, wherein the switching mechanism comprises a microswitch coupled with the audio cable.

16. A portable computer comprising:
a computer body encompassing the computer;
a processor and memory disposed within the body;
an audio input device having an audio cable coupled therewith;
the computer body having a cut out for receiving the audio input device therein; and
a retraction mechanism coupled with said audio input device, the retraction mechanism for retracting the audio input device into said cut out.

17. The portable computer as recited in claim 16, wherein the audio input device comprises a microphone assembly.

18. The portable computer as recited in claim 16, wherein the portable computer further comprises an earphone assembly retractably coupled with said computer body.

19. A portable keyboard comprising:
a keyboard body having side surfaces and an input surface;
a data entry device disposed on said input surface;
an audio input device coupled with the keyboard body;
an audio cable coupled with the audio input device;
the keyboard body having a cut out for receiving the audio input device therein; and
a retraction mechanism coupled with the audio input device, the retraction mechanism for retracting the audio input device into said cut out.

20. The portable keyboard as recited in claim 19, wherein the audio input device comprises a microphone.

* * * * *